United States Patent
Yang

(10) Patent No.: US 10,237,153 B2
(45) Date of Patent: Mar. 19, 2019

(54) PACKET RETRANSMISSION METHOD AND APPARATUS

(71) Applicant: Huawei Technologies Co., Ltd., Shenzhen (CN)

(72) Inventor: Chengyong Yang, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 15 days.

(21) Appl. No.: 15/361,112

(22) Filed: Nov. 25, 2016

(65) Prior Publication Data

US 2017/0149675 A1  May 25, 2017

(30) Foreign Application Priority Data

Nov. 25, 2015  (CN) .......................... 2015 1 0830159

(51) Int. Cl.
| | |
|---|---|
| *H04L 1/00* | (2006.01) |
| *H04L 12/26* | (2006.01) |
| *H04L 1/18* | (2006.01) |
| *H04L 12/801* | (2013.01) |
| *H04L 1/12* | (2006.01) |
| *H04L 12/863* | (2013.01) |

(52) U.S. Cl.
CPC ........ *H04L 43/0835* (2013.01); *H04L 1/1867* (2013.01); *H04L 43/0894* (2013.01); *H04L 47/193* (2013.01); *H04L 43/0852* (2013.01); *H04L 47/6215* (2013.01); *H04L 2001/125* (2013.01); *H04L 2212/00* (2013.01)

(58) Field of Classification Search
None
See application file for complete search history.

(56) References Cited

U.S. PATENT DOCUMENTS

| | | | | |
|---|---|---|---|---|
| 2004/0062267 A1* | 4/2004 | Minami | .............. | H04L 12/5693 370/463 |
| 2007/0091900 A1* | 4/2007 | Asthana | ................ | H04L 45/304 370/395.42 |
| 2007/0112962 A1* | 5/2007 | Lewontin | ................ | H04L 69/16 709/227 |
| 2007/0223379 A1* | 9/2007 | Sivakumar | .............. | H04L 47/10 370/235 |

(Continued)

FOREIGN PATENT DOCUMENTS

| | | |
|---|---|---|
| CN | 101765194 A | 6/2010 |
| CN | 103825683 A | 5/2014 |
| CN | 104365052 A | 2/2015 |

*Primary Examiner* — Phirin Sam
(74) *Attorney, Agent, or Firm* — Leydig, Voit & Mayer, Ltd.

(57) ABSTRACT

Embodiments of the present invention provide a packet retransmission method and apparatus, where the method includes: sending, by a transmit end, a first packet to a receive end by using a first path, where the first path is a path on a Transmission Control Protocol TCP data connection; receiving a response message by using a second path, where the response message is used to indicate that the receive end does not receive the first packet, and the response message includes an indication field, where the indication field is used to indicate that a packet is transmitted on the second path; and resending the first packet to the receive end by using the second path, where the resent first packet includes the indication field.

34 Claims, 9 Drawing Sheets

(56) References Cited

U.S. PATENT DOCUMENTS

| | | | |
|---|---|---|---|
| 2011/0099437 A1* | 4/2011 | Ramakrishnan | H04L 1/0007 |
| | | | 714/704 |
| 2013/0003553 A1* | 1/2013 | Samuels | H04L 41/00 |
| | | | 370/235 |
| 2013/0176847 A1* | 7/2013 | Zhao | H04L 47/40 |
| | | | 370/230 |
| 2013/0195106 A1* | 8/2013 | Calmon | H04B 7/15521 |
| | | | 370/389 |
| 2013/0339543 A1 | 12/2013 | Fall | |

* cited by examiner

PACKET RETRANSMISSION METHOD AND APPARATUS

CROSS-REFERENCE TO RELATED APPLICATION

This application claims priority to Chinese Patent Application No. 201510830159.0, filed on Nov. 25, 2015, which is hereby incorporated by reference in its entirety.

TECHNICAL FIELD

The present invention relates to the communications field, and more specifically, to a packet retransmission method and apparatus in the communications field.

BACKGROUND

One most important mechanism for Transmission Control Protocol (Transmission Control Protocol, TCP) reliability is retransmission. Retransmission in the TCP protocol is classified into timeout-based retransmission and fast retransmission.

When the timeout-based retransmission is used, a transmit end starts one timer when sending each packet segment and waits for acknowledgment information; after successfully receiving new data, a receive end returns the acknowledgment information. If data cannot be acknowledged before the timer expires, according to the TCP protocol, it is considered that data in the packet segment is lost or damaged, and the data in the packet segment needs to be reorganized and retransmitted, where the retransmitted packet is a retransmission packet. When the data is retransmitted due to overtime, and a congestion window exceeds a slow start threshold, a congestion control mechanism needs to enter a congestion avoidance state starting from slow start. The slow start needs to detect an actual network capacity to avoid congestion due to sending of excessive amount of data, and therefore retransmission efficiency is very low.

When the fast retransmission is used, if discovering a packet loss, the receive end consecutively sends a duplicate acknowledgment (duplicate Acknowledge, DUPACK) to the transmit end, where the DUPACK indicates a lost data packet. If receiving at least three DUPACKs, the transmit end may realize that a packet loss occurs on data, which needs to be retransmitted. In this case, there is no need to wait for the timer to expire. The fast retransmission may avoid a case in which the transmit end is idle for a relatively long time because of waiting for timer expiration, so as to increase network throughput. After retransmission, the transmit end may skip slow start and directly enter the congestion avoidance state.

In TCP communication, if a specific data packet is lost in a transmit sequence, the TCP retransmits a subsequent packet starting from a last acknowledged packet. In this case, a packet that has been properly transmitted previously may also be sent repeatedly, which sharply decreases TCP performance. In a TCP selective acknowledgment (Selective Acknowledge, SACK) mechanism, the receive end may send a SACK. The SACK may instruct the TCP to resend only a lost packet, instead of sending all subsequent packets. In addition, the SACK provides a corresponding mechanism that enables a receiver to tell a sender which data is lost, which data is resent, and which data has been received in advance, and the like.

In the prior art, to improve a concurrent capability of a TCP packet, a window for the TCP to receive and send a packet is relatively large, and therefore, there are relatively many TCP packets that are sent in transit. A packet that needs to be sent by the transmit end to the receive end is referred to as a common packet. Under a condition in the prior art, a retransmission packet and a common packet are transmitted on a TCP data connection path. A transmission process is strictly kept in order. The retransmission packet cannot overtake a common packet transmitted in front, which causes an increase in a quantity of out-of-order reassembly packets at the receive end, thereby leading to excessive out-of-order reassembly buffers. As a result, the buffers are overflown, out-of-order reassembly pressure of the receive end increases, and even a new packet loss may occur, which results in sharp degradation in TCP transmission performance.

SUMMARY

Embodiments of the present invention provide a packet retransmission method and apparatus, which can improve reliability of TCP data transmission.

According to a first aspect, a packet retransmission method is provided, including: sending, by a transmit end, a first packet to a receive end by using a first path, where the first path is a path on a Transmission Control Protocol TCP data connection; receiving a response message by using a second path, where the response message is used to indicate that the receive end does not receive the first packet, and the response message includes an indication field, where the indication field is used to indicate that a packet is transmitted on the second path; and resending the first packet to the receive end by using the second path, where the resent first packet includes the indication field.

In the packet retransmission method, a response message and a first packet that needs to be retransmitted are transmitted on the second path, which can shorten a transmission delay of the response message and the retransmitted first packet, so that a receive end can receive the retransmitted first packet at a smaller time interval. Therefore, when the receive end receives the first packet, only a few packets are buffered in an out-of-order reassembly buffer of the receive end, which can avoid overflow of the out-of-order reassembly buffer, and further avoid occurrence of a new packet loss, so as to reduce out-of-order reassembly pressure of the receive end and improve TCP data transmission performance. Further, in the present invention, TCP transmission performance can be improved in a case in which an intermediate node is not modified.

With reference to the first aspect, in a first implementation manner of the first aspect, the second path is a path different from the first path on the TCP data connection, and the indication field is a priority field of a virtual local area network VLAN tag, which may be better compatible with the prior art.

With reference to the first aspect, in a second implementation manner of the first aspect, when a packet header of the first packet includes the virtual local area network VLAN tag, the resending the first packet to the receive end by using the second path includes: modifying the priority field of the VLAN tag to 111; and sending a modified first packet to the receive end by using the second path.

With reference to the first aspect, in a third implementation manner of the first aspect, when a packet header of the first packet does not include the VLAN tag, the resending the first packet to the receive end by using the second path includes: adding the VLAN tag to the packet header of the first packet, where the priority field of the VLAN tag is 111; and sending a modified first packet to the receive end by using the second path.

With reference to the first aspect, in a fourth implementation manner of the first aspect, the second path is a path on a TCP control connection, and the indication field is an address field in a TCP protocol format of the TCP control connection; and before the receiving a response message by using a second path, the method further includes: establishing the TCP control connection with the receive end. The TCP control connection is specially used to transmit an emergency packet. Therefore, a transmission delay of a packet on the TCP control connection is lower than a transmission delay of a packet on the foregoing TCP data connection.

With reference to the first aspect, in a fifth implementation manner of the first aspect, the response message may be encapsulated according to the TCP protocol format, where a priority field of the VLAN tag in the TCP protocol format may be 111; and after the receiving a response message by using a second path, the response message is decapsulated.

With reference to the first aspect, in a sixth implementation manner of the first aspect, the resending the first packet to the receive end by using the second path includes: encapsulating the first packet according to the TCP protocol format, where a priority field of the VLAN tag in a packet header of the encapsulated first packet is 111; and sending the encapsulated first packet to the receive end by using the second path.

With reference to the first aspect, in a seventh implementation manner of the first aspect, when the first path is on a first route, the establishing the TCP control connection with the receive end includes: establishing the TCP control connection with the receive end on the first route.

With reference to the first aspect, in an eighth implementation manner of the first aspect, when the first path is on a second route, the establishing the TCP control connection with the receive end includes: establishing the TCP control connection with the receive end on a third route, where a transmission rate of the third route is higher than that of the second route, and the third route may be a wireless route.

With reference to the first aspect, in a ninth implementation manner of the first aspect, after the resending the first packet to the receive end by using the second path, the method further includes: receiving an acknowledgment ACK message by using the second path, where the ACK message is used by the transmit end to determine that the receive end receives the encapsulated first packet, and the ACK message includes the address field.

With reference to the first aspect, in a tenth implementation manner of the first aspect, when the transmit end does not receive the ACK message within a retransmission timeout RTO time after sending the encapsulated first packet, the transmit end resends the first packet by using the second path.

Therefore, a transmit end can detect a transmission status of a retransmission packet, and discover, in a timely manner, whether the retransmission packet is lost for a second time, so as to determine whether a lost packet needs to be retransmitted again, which further improves reliability of TCP data transmission.

In the tenth implementation manner of the first aspect, when a quantity of times that the transmit end resends the retransmission packet exceeds N times, the transmit end stops sending the retransmitted packet to a receive end.

Therefore, it may be avoided that the transmit end resends the retransmission packet for multiple times because when receiving the retransmission packet, the receive end does not send acknowledgment information in a timely manner, or sent acknowledgment information cannot be sent to the transmit end.

With reference to the first aspect, in an eleventh implementation manner of the first aspect, the response message includes a duplicate acknowledgment DUPACK or a selective acknowledgment SACK.

With reference to the first aspect, in a twelfth implementation manner of the first aspect, the first path has a first transmit queue and/or a first receive queue, and the second path has a second transmit queue and/or a second receive queue, where a priority of the second transmit queue is higher than that of the first transmit queue, and a priority of the second receive queue is higher than that of the first receive queue.

According to a second aspect, a packet retransmission method is provided, including: determining, by a receive end, that a first packet sent by a transmit end is not received on a first path, where the first path is a path on a Transmission Control Protocol TCP data connection; determining a second path; sending a response message to the transmit end by using the second path, where the response message is used to indicate that the receive end does not receive the first packet, and the response message includes an indication field, where the indication field is used to indicate that a packet is transmitted on the second path; and receiving, by using the second path, the first packet that is resent by the transmit end, where the resent first packet includes the indication field.

In the packet retransmission method, a response message and a first packet that needs to be retransmitted are transmitted on the second path, which can shorten a transmission delay of the response message and the retransmitted first packet, so that a receive end can receive the retransmitted first packet at a smaller time interval. Therefore, when the receive end receives the first packet, only a few packets are buffered in an out-of-order reassembly buffer of the receive end, which, in this case, can avoid overflow of the out-of-order reassembly buffer, and further avoid occurrence of a new packet loss, so as to reduce out-of-order reassembly pressure of the receive end and improve TCP data transmission performance. Further, in the present invention, TCP transmission performance can be improved in a case in which an intermediate node is not modified.

With reference to the second aspect, in a first implementation manner of the second aspect, the determining a second path includes: determining that the second path is a path different from the first path on the TCP data connection, and the indication field is a priority field of a virtual local area network VLAN tag, which can be better compatible with the prior art.

With reference to the second aspect, in a second implementation manner of the second aspect, when a packet header of the response message includes the virtual local area network VLAN tag, the sending a response message to the transmit end by using a second path includes: modifying the priority field of the VLAN tag to 111; and sending a modified response message to the transmit end by using the second path.

With reference to the second aspect, in a third implementation manner of the second aspect, when a packet header of the response message does not include the VLAN tag, the sending a response message to the transmit end by using a second path includes: adding the VLAN tag to the packet header of the response message, where the priority field of the VLAN tag is 111; and sending a modified response message to the receive end by using the second path.

With reference to the second aspect, in a fourth implementation manner of the second aspect, the determining a second path includes: determining that the second path is a path on a TCP control connection, and the indication field is an address field in a TCP protocol format of the TCP control connection; and before the determining a second path, the method further includes: establishing the TCP control connection with the transmit end. The TCP control connection is specially used to transmit an emergency packet. Therefore, a transmission delay of a packet on the TCP control connection is lower than a transmission delay of a packet on the foregoing TCP data connection.

With reference to the second aspect, in a fifth implementation manner of the second aspect, the sending a response message to the transmit end by using a second path includes: encapsulating the response message according to the TCP protocol format, where a priority field of the VLAN tag in a packet header of the encapsulated response message is 111; and sending the encapsulated response message to the receive end by using the second path.

With reference to the second aspect, in a sixth implementation manner of the second aspect, a priority field of the VLAN tag in a packet header of the resent first packet is 111; and after the receiving, by using the second path, the first packet that is resent by the transmit end, the method further includes: decapsulating the resent first packet, so as to obtain the first packet.

With reference to the second aspect, in a seventh implementation manner of the second aspect, when the first path is on a first route, the establishing the TCP control connection with the receive end includes: establishing the TCP control connection with the receive end on the first route.

With reference to the second aspect, in an eighth implementation manner of the second aspect, when the first path is on a second route, the establishing the TCP control connection with the receive end includes: establishing the TCP control connection with the receive end on a third route, where a transmission rate of the third route is higher than that of the second route, and the third route may be a wireless route.

With reference to the second aspect, in a ninth implementation manner of the second aspect, after the receiving, by using the second path, the first packet that is resent by the transmit end, the method further includes: sending an acknowledgment ACK message to the transmit end by using the second path, where the ACK message is used by the transmit end to determine that the receive end receives the resent first packet, and the ACK message includes the address field.

In this case, a transmit end can detect a transmission status of a retransmission packet, and discover, in a timely manner, whether the retransmission packet is lost for a second time, so as to determine whether a lost packet needs to be retransmitted again, which further improves reliability of TCP data transmission.

With reference to the second aspect, in a tenth implementation manner of the second aspect, the response message includes a duplicate acknowledgment DUPACK or a selective acknowledgment SACK.

With reference to the second aspect, in an eleventh implementation manner of the second aspect, the first path has a first transmit queue and/or a first receive queue, and the second path has a second transmit queue and/or a second receive queue, where a priority of the second transmit queue is higher than that of the first transmit queue, and a priority of the second receive queue is higher than that of the first receive queue.

According to a third aspect, a packet retransmission apparatus is provided, where the apparatus is a transmit end, for example, a server or a client, which is configured to execute the method in the foregoing first aspect or any possible implementation manner of the first aspect. Specifically, the apparatus includes a unit configured to execute the method in the foregoing first aspect or any possible implementation manner of the first aspect.

According to a fourth aspect, a packet retransmission apparatus is provided, where the apparatus is a receive end, for example, a server or a client, which is configured to execute the method in the foregoing second aspect or any possible implementation manner of the second aspect. Specifically, the apparatus includes a unit configured to execute the method in the foregoing second aspect or any possible implementation manner of the second aspect.

According to a fifth aspect, a packet retransmission apparatus is provided, where the apparatus is a transmit end, for example, a server or a client, and the apparatus includes a transceiver, a memory, a processor, and a bus system. The transceiver, the memory, and the processor are connected to each other by using the bus system. The memory is configured to store an instruction, and the processor is configured to execute the instruction stored in the memory. When the processor executes the instruction stored in the memory, the execution enables the processor to execute the method in the first aspect or any possible implementation manner of the first aspect.

According to a sixth aspect, a packet retransmission apparatus is provided, where the apparatus is a receive end, for example, a server or a client, and the apparatus includes a transceiver, a memory, a processor, and a bus system. The transceiver, the memory, and the processor are connected to each other by using the bus system. The memory is configured to store an instruction, and the processor is configured to execute the instruction stored in the memory. When the processor executes the instruction stored in the memory, the execution enables the processor to execute the method in the second aspect or any possible implementation manner of the second aspect.

According to a seventh aspect, a computer readable medium is provided and is configured to store a computer program, where the computer program includes an instruction used to execute the method in the first aspect or any possible implementation manner of the first aspect.

According to an eighth aspect, a computer readable medium is provided and is configured to store a computer program, where the computer program includes an instruction used to execute the method in the second aspect or any possible implementation manner of the second aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
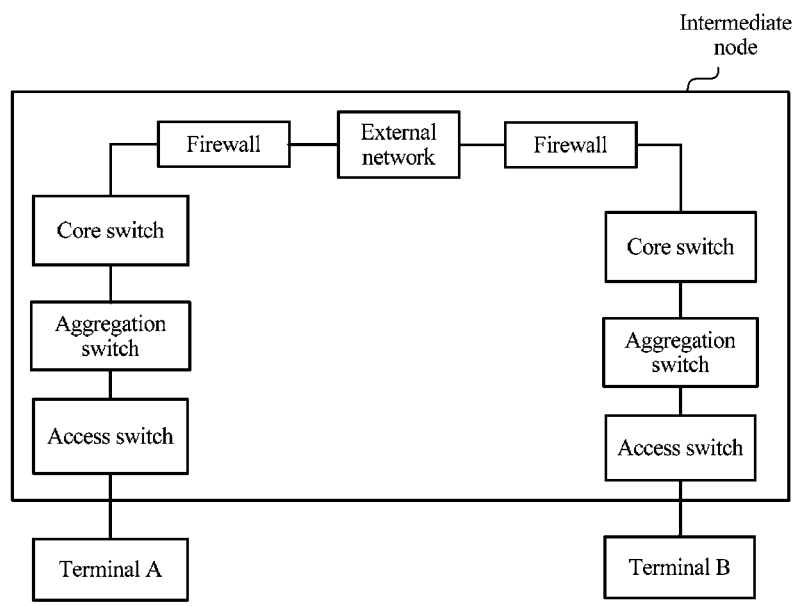
FIG. 1 is a networking diagram of a scenario of packet retransmission according to an embodiment of the present invention.

FIG. 1 is a networking diagram of a scenario of TCP data transmission. A terminal A and a terminal B in the figure may be separately a server, a client, user equipment, a mobile terminal, or the like. The terminal A may send data to the terminal B, and in this case, the terminal A is a transmit end, and the terminal B is a receive end. The terminal B may also send data to the terminal A, and in this case, the terminal B is a transmit end, and the terminal A is a receive end.

When the transmit end sends data to the receive end, the transmit end encapsulates to-be-transmitted data into a packet, where the packet includes a Media Access Control (Media Access Control, MAC) header, an Internet Protocol (Internet Protocol, IP) header, a TCP header, and data. The packet finally reaches a receive queue of the receive end by using a transmit queue of the transmit end and via multiple intermediate nodes in FIG. 1, which may, for example, be multiple switches and routers. A response message returned by the receive end after receiving the packet also needs to pass through the multiple intermediate nodes in FIG. 1 and reaches a receive queue of the transmit end.

Figure 2:
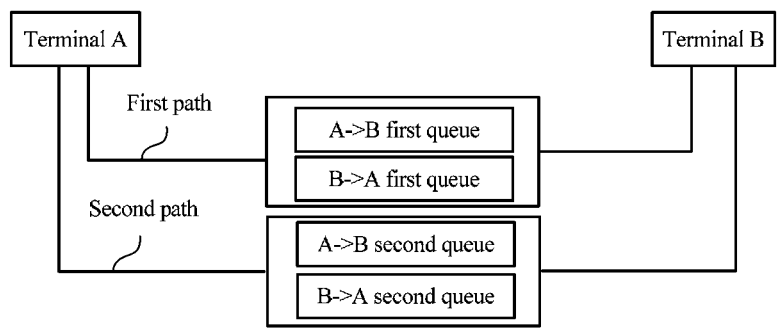
FIG. 2 is a schematic diagram of another scenario of packet retransmission according to an embodiment of the present invention.

In this embodiment of the present invention, as shown in FIG. 2, the terminal A sends a data packet to the terminal B by using a first path, where the terminal A is a transmit end and the terminal B is a receive end. The first path is a path on a TCP data connection. When discovering, according to a number in a packet header of the received data packet, that a packet is lost, the terminal B may send a response message to the terminal A by using a second path, where the response message may be a DUPACK or a SACK. After receiving the response message, the terminal A resends, to the terminal B by using the second path again, a lost packet indicated by the response message. In this case, the resent packet is a retransmission packet.

Herein, the response message and the retransmission packet are referred to as emergency packets.

In this embodiment of the present invention, the TCP data connection is a physical path, and the first path is a logical path in the physical path. The physical path may include one or more logical paths, and each logical path includes transmission queues of one or more intermediate nodes. The intermediate node may, for example, be a switch, a firewall, or a router.

The foregoing logical path includes an A to B direction (A→B) queue and a B to A direction (B→A) queue. The A→B queue includes a first transmit queue of the terminal A and/or a first receive queue of the terminal B, and transmission queues of multiple intermediate nodes on the first path. The B→A queue includes a first transmit queue of the terminal B and/or a first receive queue of the terminal A, and transmission queues of multiple intermediate nodes on the first path.

For example, as shown in FIG. 2, the first path includes an A→B first queue and a B→A first queue, and the second path includes an A→B second queue and a B→A second queue.

Optionally, as an example, the second path may be a logical path on the foregoing TCP data connection, and a priority of the second path is higher than a priority of the first path.

Specifically, the first path has a first transmit queue and/or a first receive queue, and the second path has a second transmit queue and/or a second receive queue. A priority of the second transmit queue is higher than a priority of the first transmit queue, and a priority of the second receive queue is higher than a priority of the first receive queue. A priority of a transmission queue of an intermediate node on the second path is higher than a priority of a transmission queue of an intermediate node on the first path.

Optionally, a priority field of a virtual local area network (Virtual Local Area Network, VLAN) tag in a packet header of an emergency packet may be set to 111. When the emergency packet is a response message, a priority field of a VLAN tag of the response message is 111.

Optionally, when there is no VLAN tag in the emergency packet, the VLAN tag is added to the packet header, and a priority field of the added VLAN tag is 111.

A tag protocol identifier (Tag Protocol Identifier, TPID) in the VLAN tag can be used to determine whether a packet carries a VLAN tag, whose length is 16 bits and whose default value is 0x8100. A length of a priority field is 3 bits, and when the field is set to 111, it indicates that a priority of the packet is a highest priority.

Therefore, a priority of the emergency packet is higher than that of a common packet; the emergency packet can enter a high priority second transmit queue, and, when transmitted on an intermediate node, can enter a high priority transmission queue. The high priority second transmit queue and the high priority transmission queue form the second path in this embodiment of the present invention.

Because in a transmission process, a quantity of emergency packets is less than a quantity of common packets, an emergency packet can enter the second transmit queue very soon without a need of waiting. By using a quality of service (Quality of Service, QoS) function of the intermediate node on the second path, when transmitted on the intermediate node, the emergency packet can enqueue a high priority transmission queue, so as to shorten a transmission time of the emergency packet on the intermediate node. Therefore, in this embodiment of the present invention, a transmission delay of the emergency packet at the transmit end and the receive end, and on each intermediate node can be shortened.

It should be noted that, in this embodiment of the present invention, in a case in which the intermediate node is not corrected, TCP transmission performance can be improved, that is, a terminal A and a terminal B for transmitting data in this embodiment of the present invention can be well compatible with an intermediate node in the prior art. It may be understood that, in this embodiment of the present invention, only an example in which the emergency packet has a highest priority is used for description, that is, only an example in which a priority field of the emergency packet is 111 is used for description. Optionally, when the priority of the emergency packet is higher than the priority of the common packet, for example, the priority field of the emergency packet is 010, and a priority field of the common packet is 001, the priority of the emergency packet is still higher than the priority of the common packet, which also pertains to the technical concept of the present invention, and falls within the protection scope of this embodiment of the present invention.

It should be understood that, when the second path is a high priority path in TCP data transmission, in a case in which a network condition is relatively good, no packet is lost, and no emergency packet is transmitted. In this case, a bandwidth of the second path is close to 0. Because an emergency packet in the second path is just preferentially scheduled, and cannot be permanently allocated with an exclusive network bandwidth, when there is no emergency packet, the bandwidth of the second path may be shared by a data stream of the first path, that is, a bandwidth of the first path may be a full bandwidth of the TCP data connection.

It should be further understood that, when the second path is a high priority path on the TCP data connection, only single-ended optimization may be performed, that is, a high priority transmit queue is added only to the transmit end or the receive end and the priority of the emergency packet is increased, and no high priority receive queue is necessarily added to the receive end. This may improve TCP retransmission performance and implement good compatibility with an existing TCP system.

Optionally, as another example, the second path may be a logical path on a high priority TCP control connection, where the TCP control connection and the foregoing TCP data connection are different physical paths.

Specifically, at any moment before the terminal A and the terminal B are to use the foregoing TCP control connection to transmit the emergency packet, a high priority TCP control connection may be established between the terminal A and the terminal B by means of three-way handshaking, and a logical path in the TCP control connection is used as a second path. The TCP control connection may be specially used to transmit the emergency packet, that is, the TCP control connection may have one and only one logical path, and the logical path is used as the second path.

It should be understood that, when the emergency packet is transmitted by using a special TCP control connection, because in a transmission process, a quantity of emergency packets is less than a quantity of common packets, the emergency packet can enter the TCP control connection very soon without a need of waiting. The TCP control connection and the foregoing TCP data connection are different physical paths, and the TCP control connection may have fewer intermediate nodes, which, therefore, may shorten a transmission time of the emergency packet on the intermediate node. Therefore, in this embodiment of the present invention, a transmission delay resulting from transmission of the emergency packet at the transmit end and the receive end, and on each intermediate node can be shortened.

It should be noted that, in this embodiment of the present invention, the terminal A may initiate a request for establishing a TCP control connection to the terminal B, and the terminal B may also initiate a request for establishing a TCP control connection to the terminal A, which is not limited in the present invention.

When the second path is a logical path on the foregoing TCP control connection, the transmit end may further detect a transmission status of the retransmission packet. For example, if discovering that a retransmitted packet is lost again, the transmit end may retransmit the lost packet again, so as to determine that the receive end can receive a packet that is sent by the transmit end. Therefore, when the emergency packet is transmitted by using the TCP control connection, a transmission rate of the emergency packet is improved and, at the same time, reliability of TCP transmission may be further improved.

Optionally, when the emergency packet is transmitted by using the TCP control connection, the emergency packet needs to be encapsulated and numbered. As an example, in this embodiment of the present invention, the emergency packet is encapsulated according to a TCP protocol format shown in FIG. 3.

Figure 3:
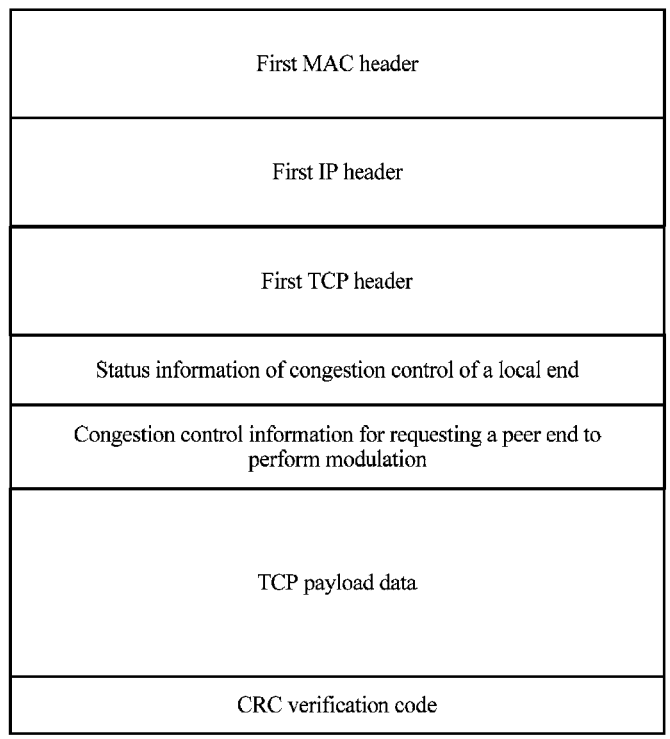
FIG. 3 is a schematic diagram of a TCP protocol format of packet retransmission according to an embodiment of the present invention.

When the emergency packet is a retransmission packet, the retransmission packet may be encapsulated according to a TCP packet format in FIG. 3, and the encapsulated retransmission packet has a TCP packet header of a TCP control connection and TCP payload data (payload) of a TCP control connection, where the TCP payload data of a TCP control connection includes a retransmission packet of a TCP data connection. It may be understood that, the encapsulated retransmission packet includes the TCP packet header of a TCP control connection and a TCP packet header of a TCP data connection.

When the emergency packet is a response message, the response message may be encapsulated according to the TCP packet format in FIG. 3, and the encapsulated response message has a TCP packet header of a TCP control connection and TCP payload data of a TCP control connection, where the payload data may be the response message. Herein, the encapsulated response message may have the TCP packet header of a TCP control connection, or the encapsulated response message may have the TCP packet header of a TCP control connection and the TCP packet header of a TCP data connection.

The TCP packet header of a TCP control connection of the encapsulated emergency packet includes a first MAC header, a first IP header, and a first TCP header.

It should be noted that, a source MAC address in the first MAC header is a MAC address of a terminal that sends the emergency packet, and a destination MAC address is a MAC address of a terminal that receives the emergency packet. A source IP address in the first IP header is an IP address of the terminal that sends the emergency packet, and a destination IP address is an IP address of the terminal that receives the emergency packet. A source port in the first TCP header is a port of a TCP control connection on which the emergency packet is sent, and a destination port is a port of a TCP control connection on which the emergency packet is received.

When the foregoing TCP control connection has multiple logical paths, and the multiple logical paths are all used to transmit a packet, the first MAC header may include a VLAN tag. The VLAN tag includes a priority field of the encapsulated emergency packet, and the priority field may be 111, which indicates that the emergency packet has a highest priority in a transmission process. Therefore, the emergency packet may be preferentially transmitted on the TCP control connection.

Optionally, the TCP protocol format in FIG. 3 may further include congestion control information. The congestion control information is, for example, status information of congestion control of a local end and congestion control information for requesting a peer end to perform adjustment. Therefore, a congestion control state of a local end that sends the emergency packet and a congestion control state of a peer end that receives the emergency packet may be synchronized, a transmission delay of the emergency packet may be further shortened, and reliability of emergency packet transmission is improved.

The TCP protocol format in FIG. 3 may further include a cyclical redundancy check (Cyclical Redundancy Check, CRC) verification code, which may be used to determine whether data transmission is correct.

Therefore, the encapsulated emergency packet can be transmitted on the TCP control connection, and when transmitted, can enqueue a high priority transmit queue, and a high priority transmit and receive queue of an intermediate node. Therefore, a transmission rate of the emergency packet may be higher than a transmission rate of a common packet, which can avoid overflow of an out-of-order reassembly buffer of a receive end, and further avoid occurrence of a new packet loss, so as to reduce out-of-order reassembly pressure of the receive end and improve TCP data transmission performance.

Optionally, the TCP control connection and the TCP data connection may be a same route.

That is, a MAC address and an IP address of the TCP control connection are the same as those of the TCP data connection; however, a source port and a destination port of the TCP control connection are different from those of the TCP data connection.

Therefore, a transmission bandwidth of another route does not need to be occupied, and compatibility with an existing terminal and intermediate node is relatively good.

Optionally, the TCP control connection and the TCP data connection may be different routes, and a transmission rate of a route of the TCP control connection is higher than a transmission rate of a route of the TCP data connection.

Therefore, a MAC address, an IP address, and a port of the TCP control connection are all different from those of the TCP data connection. A transmit end may determine, according to a packet header of the packet, a TCP connection on which the packet is transmitted.

Optionally, in this embodiment of the present invention, a route of the TCP control connection may be a wireless route. The wireless route has fewer intermediate nodes, which may shorten a delay that is caused when the emergency packet is transmitted on the intermediate node, and further reduce a quantity of packets for which the receive end needs to perform out-of-order reassembly.

Figure 4:
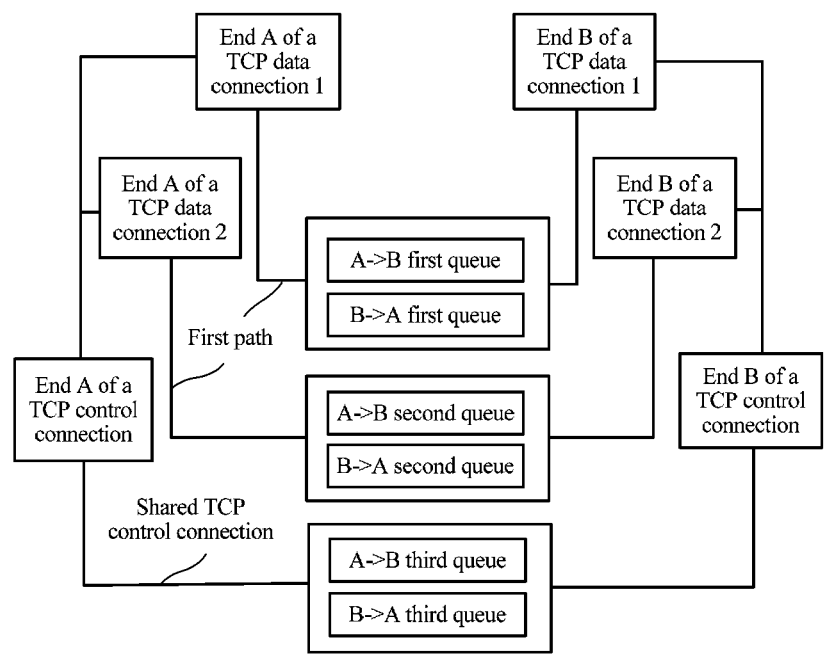
FIG. 4 is a schematic diagram of another scenario of packet retransmission according to an embodiment of the present invention.

As shown in FIG. 4, as an embodiment, if multiple TCP data connections exist between a terminal A and a terminal B, and start points and end points of the multiple TCP data connections are consistent, that is, when source MAC addresses and destination MAC addresses, and source IP addresses and destination IP addresses of the multiple TCP data connections are all the same, emergency packets on the multiple TCP data connections may be transmitted by using one shared TCP control connection.

Therefore, after receiving an encapsulated emergency packet by using the foregoing shared TCP control connection, a receive end may decapsulate a TCP packet transmitted on the shared TCP control connection. Then, the receive end distributes a decapsulated emergency packet to different TCP data connections according to a packet header of the decapsulated packet.

Therefore, in this embodiment of the present invention, a response message and a retransmission packet are transmitted on the second path, which can shorten a transmission delay of the response message and the retransmission packet, so that the retransmission packet can overtake a common packet transmitted in front, and a receive end can receive a retransmitted packet at a smaller time interval. Therefore, when the receive end receives the first packet, only a few packets are buffered in an out-of-order reassembly buffer of the receive end, which can avoid overflow of the out-of-order reassembly buffer, and further avoid occurrence of a new packet loss, so as to reduce out-of-order reassembly pressure of the receive end and improve TCP data transmission performance.

Figure 5:
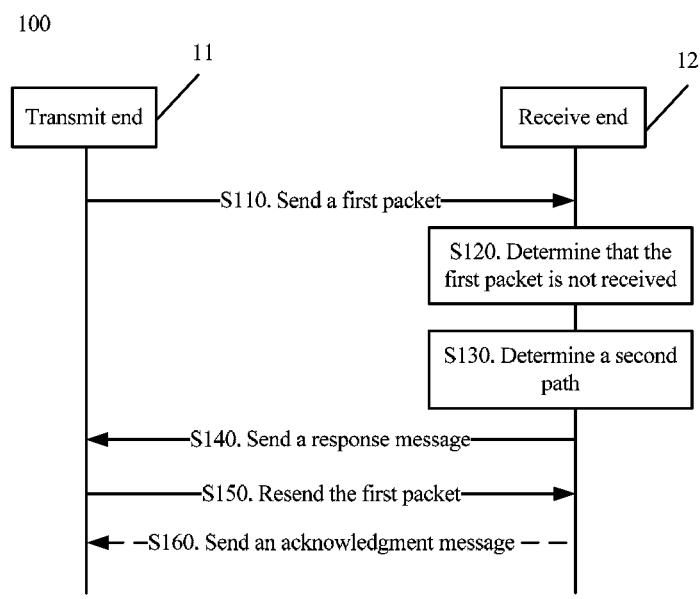
FIG. 5 is an interaction flowchart of a specific embodiment of packet retransmission according to an embodiment of the present invention.

FIG. 5 is a schematic flowchart of a data transmission method 100 according to an embodiment of the present invention. The method includes:

S110. A transmit end 11 sends a first packet to a receive end 12 by using a first path, where the first path is a path on a Transmission Control Protocol TCP data connection.

Figure 6:
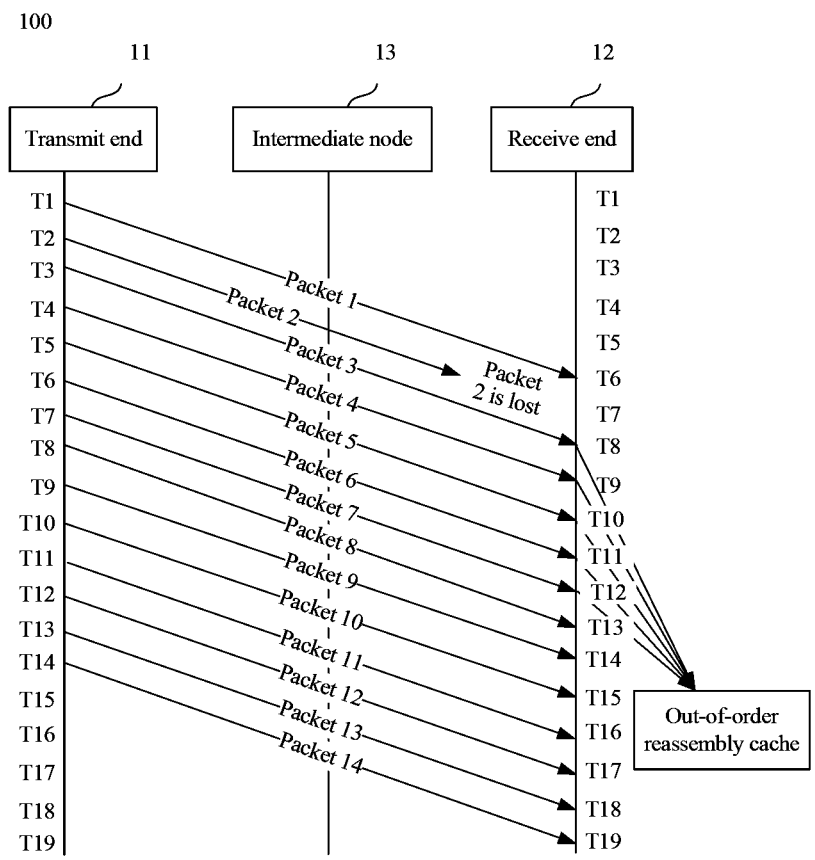
FIG. 6 is a schematic diagram of a specific embodiment of packet retransmission according to an embodiment of the present invention.

Specifically, when a terminal A in FIG. 2 sends a packet to a terminal B, the transmit end 11 may be the terminal A in FIG. 2, and the receive end 12 may be the terminal B in FIG. 2. FIG. 6 shows a flowchart of packet transmission on a first path in a specific embodiment. As shown in FIG. 6, a time interval at which the transmit end 11 sends two consecutive packets is T, and a transmission time of each packet on the first path is 5T. The transmit end 11 successively sends multiple packets to the receive end 12 according to numbers of multiple to-be-sent packets. The multiple to-be-transmitted packets have a same priority, and when transmitted on the first path, are strictly kept in order.

For details about the first path, refer to the description in FIG. 2. To avoid repetition, details are not described herein.

S120. The receive end 12 determines that the first packet that is sent by the transmit end 11 is not received on the first path.

Specifically, the receive end can determine, according to numbers of multiple received packets, a packet that does not reach the receive end, that is, the lost packet. For example, in FIG. 6, after receiving a packet 1, the receive end receives a packet 3; in this case, the receive end 12 can determine, according to a number in a packet header, that a packet 2 is lost, that is, the packet 2 is the first packet in this embodiment of the present invention.

In this case, the receive end starts a delay acknowledgment (Delayack) mechanism, and stores all packets that are received after a T8 in an out-of-order reassembly buffer, for example, a packet 3, a packet 4, a packet 5, a packet 6, and a packet 7 shown in FIG. 6, where the out-of-order reassembly buffer may be an out-of-order packet pool. In this embodiment of the present invention, when the receive end 12 receives a packet 2 that is resent by the transmit end 11, the receive end reassembles buffered packets.

S130. The receive end determines a second path.

For details about the second path, refer to the description in FIG. 2. To avoid repetition, details are not described herein.

S140. Send a response message to the transmit end by using the second path, where the response message is used to indicate that the receive end does not receive the first packet, and the response message includes an indication field, where the indication field is used to indicate that a packet is transmitted on the second path.

Figure 7:
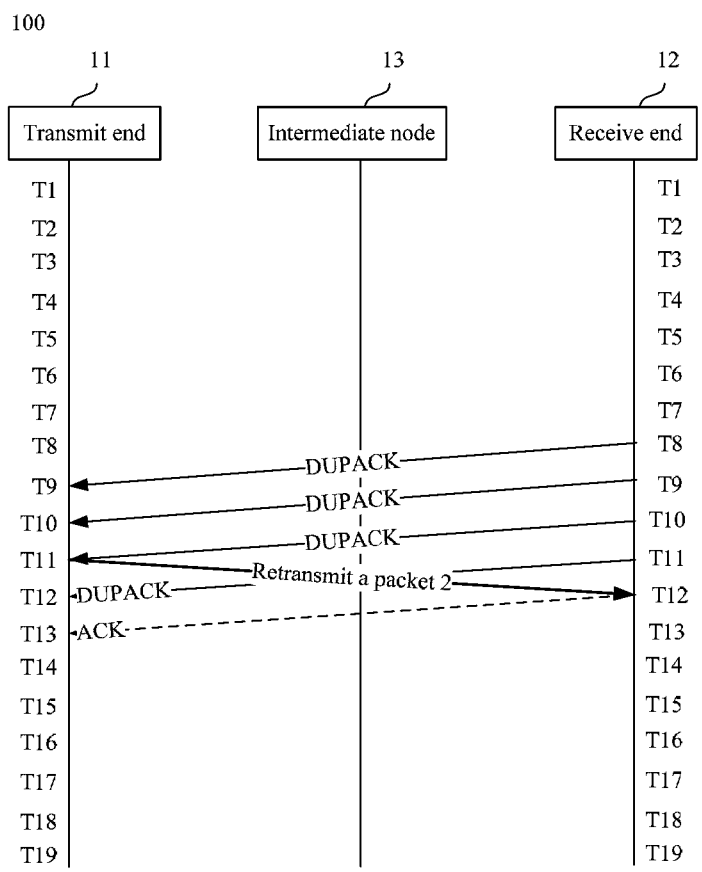
FIG. 7 is a schematic diagram of another specific embodiment of packet retransmission according to an embodiment of the present invention.

For example, in FIG. 7, the response message is used to indicate that a packet 2 is not received. The response message may, for example, be the response message in FIG. 2, and the receive end sends, according to the indication field, the response message to the transmit end 11 by using the second path.

Optionally, in this embodiment of the present invention, the response message may be a duplicate acknowledgment DUPACK or a selective acknowledgment SACK.

Optionally, as an example, the second path may be a logical path on the TCP data connection. Therefore, the receive end may set a priority field of the VLAN tag in a packet header of the response message to 111. The receive end enables, according to the priority field, the response message to enter a high priority transmit queue, so as to enable the response message to be transmitted on the second path.

It should be understood that, in this embodiment of the present invention, because the response message needs to be transmitted on a high priority second path, a priority of the response message is higher than a priority of a common packet in FIG. 7. For example, when a priority field of the VLAN tag in the first response message is set to 111, the first response message has a highest priority.

When the packet header of the response message includes the virtual local area network VLAN tag, a priority field of the VLAN tag is modified to 111, and then a modified response message is sent to the receive end by using the second path.

When the packet header of the response message does not include the VLAN tag, a VLAN tag is added to the packet header of the response message, where a priority field of the VLAN tag is 111; and then a modified response message is sent to the receive end by using the second path.

Optionally, as another example, the second path may further be a logical path on a TCP control connection, and the indication field is an address field in a TCP protocol format of the TCP control connection. The TCP protocol format is, for example, the TCP protocol format described in FIG. 3. The address field is, for example, a MAC address, an IP address, and a port address on the TCP control connection. Before the first response message is sent to the transmit end by using the second path, the TCP control connection may be established.

Optionally, when the second path is a logical path on the TCP control connection, the response message may be encapsulated according to the TCP protocol format.

When the TCP control connection has multiple logical paths, and the multiple logical paths all perform packet transmission, a priority of the encapsulated response message may be higher than a priority of another packet on the TCP control connection, for example, a priority field of the VLAN tag in a packet header of the encapsulated response message may be 111; then the encapsulated response message is sent to the receive end by using the second path.

It should be noted that, a source MAC address of a TCP packet header of a TCP control connection of the encapsulated response message is a MAC address of the receive end 12, a source IP address is an IP address of the receive end 12, and a source port is a port on a side of the receive end 12 of the TCP control connection; and a destination MAC address of a packet header of the second response message is a MAC address of the transmit end 11, a destination IP address is an IP address of the transmit end 11, and a destination port is a port on a side of the transmit end 11 of the TCP control connection.

Optionally, when start points and end points of multiple TCP data connections are the same, the multiple TCP data connections may share one TCP control connection.

Specifically, the response message and the second path may be the response message and the second path that are described in FIG. 2 to FIG. 4. To avoid repetition, details are not described herein.

FIG. 7 shows a flowchart of packet transmission on a second path in a specific embodiment. As shown in FIG. 7, a receive end 12 sends a DUPACK to a transmit end at each time interval after a time point T8, until the receive end 12 receives a retransmitted packet 2. Because a transmission time of a packet on the second path is T, which is obviously less than a transmission time 5T of a packet on a first path, the transmit end 11 receives a DUPACK packet that is sent by the receive end at a time point T9.

S150. The transmit end 11 resends the first packet to the receive end 12 by using the second path, where the resent first packet includes the indication field in the foregoing S140.

Specifically, the transmit end determines a lost packet according to a received response message. In FIG. 7, the transmit end consecutively receives, at T9, T10, and T11 moments, the DUPACK that is sent by the receive end. After receiving three response messages, the transmit end determines that a packet 2 is a packet that needs to be resent, that is, the foregoing first packet.

Optionally, as an example, the second path may be a logical path different from the first path on the TCP data transmission, and the foregoing indication field is a priority field of a virtual local area network VLAN tag. Therefore, the receive end may set a priority field of the VLAN tag in the first packet to 111.

It should be understood that, in this embodiment of the present invention, because the first packet needs to be transmitted on the second path, a priority of the first packet is higher than a priority of a common packet in FIG. 6. For example, when the priority field of the VLAN tag in the first packet is set to 111, the first packet has a highest priority.

When a packet header of the first packet includes the virtual local area network VLAN tag, a priority field of the VLAN tag is modified to 111, and then a modified first packet is sent to the receive end by using the second path.

When a packet header of the first packet does not include the VLAN tag, a VLAN tag is added to the packet header of the first packet, where a priority field of the VLAN tag is 111; and then a modified first packet is sent to the receive end by using the second path.

For example, as shown in FIG. 7, the transmit end sends, at the T11 moment, the first packet to the receive end by using the second path. Because the first packet has a highest priority, the first packet may reach the receive end at a T12 moment.

Optionally, as another example, the second path may be a logical path on a TCP control connection, and the indication field is an address field in a TCP protocol format of the TCP control connection. Before sending the first packet on the second path, the transmit end encapsulates the first packet according to the foregoing TCP protocol format.

When the TCP control connection has multiple logical paths, and the multiple logical paths all perform packet transmission, a priority of the encapsulated response message may be higher than a priority of another packet on the TCP control connection, for example, a priority field of the VLAN tag in a packet header of the encapsulated first packet may be 111.

It should be noted that, a source MAC address of a TCP packet header of a TCP control connection of the encapsulated first packet is a MAC address of the transmit end 11, a source IP address is an IP address of the transmit end 11, and a source port is a port on a side of the transmit end 11 of the TCP control connection; and a destination MAC address of a TCP packet header of a TCP control connection of the encapsulated first packet is a MAC address of the receive end 12, a destination IP address is an IP address of the receive end 12, and a destination port is a port on a side of the receive end 12 of the TCP control connection.

It should be further noted that, when start points and end points of multiple TCP data connections are the same, the multiple TCP data connections may share one TCP control connection. For details, refer to the description in FIG. 4. To avoid repetition, details are not described herein.

Specifically, the first packet and the second path may be the retransmission packet and the second path that are described in FIG. 2 to FIG. 4. To avoid repetition, details are not described herein.

Therefore, when transmitted on the second path, the first packet can overtake a packet 8 to a packet 10 in FIG. 6, and compensate a packet loss gap of the receive end in a timely manner. Only a packet 3 to a packet 7 in an out-of-order reassembly buffer need to be reassembled, which reduces a quantity of packets for which the receive end needs to perform out-of-order reassembly; and the out-of-order reassembly buffer is not likely to be overflown, which further avoids occurrence of a new packet loss, so as to reduce out-of-order reassembly pressure of the receive end and improve TCP data transmission performance.

Therefore, in this embodiment of the present invention, a response message and a first packet that needs to be retransmitted are transmitted on the second path, which can shorten a transmission delay of the response message and a retransmitted first packet, so that a receive end can receive the retransmitted first packet at a smaller time interval. Therefore, when the receive end receives the first packet, only a few packets are buffered in an out-of-order reassembly buffer of the receive end, which can avoid overflow of the out-of-order reassembly buffer, and further avoid occurrence of a new packet loss, so as to reduce out-of-order reassembly pressure of the receive end and improve TCP data transmission performance.

Optionally, in this embodiment of the present invention, when the second path is a logical path on the TCP control connection, after the first packet sent by the transmit end is received by using the second path, the method further includes:

S160. The receive end 12 sends an acknowledgment ACK message to the transmit end 11 by using the second path, where the ACK message is used by the transmit end 11 to determine that the receive end 12 receives the resent first packet, and a packet header of the ACK message includes the foregoing address field.

When a retransmission packet is transmitted on a second path on the TCP control connection, a transmission status of the retransmission packet may be detected in a timely manner by sending acknowledgment information, where the acknowledgment information is, for example, the foregoing ACK information.

Specifically, the ACK message may be encapsulated according to a TCP protocol format of the response message in S140. To avoid repetition, details are not described herein.

Therefore, the transmit end 11 can detect the transmission status of the retransmission packet, and discover, in a timely manner, whether the retransmission packet is lost for a second time, so as to determine whether a lost packet needs to be retransmitted again, which further improves reliability of TCP data transmission.

For example, as shown in FIG. 7, when receiving the retransmitted packet 2, the receive end 12 may send ACK information to the transmit end 11. When receiving the ACK information, the transmit end 11 no longer retransmits the packet 2 to the receive end.

Optionally, when the transmit end does not receive the ACK information within a retransmission timeout (Retransmission Time Out, RTO) time after resending the first packet in S150, the transmit end resends the first packet.

It should be understood that, when resending the first packet, the transmit end may encapsulate the first packet again, or may directly send the encapsulated first packet in S140.

Figure 8:
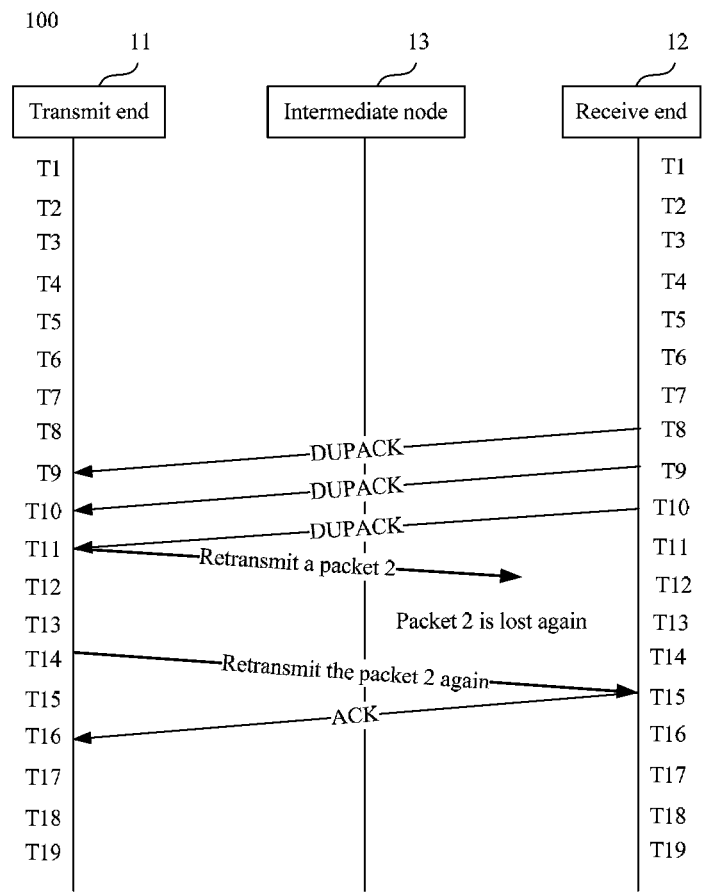
FIG. 8 is a schematic diagram of another specific embodiment of packet retransmission according to an embodiment of the present invention.

For example, FIG. 8 shows a flowchart of packet transmission on a second path in another specific embodiment. As shown in FIG. 8, the first packet is a packet 2. When the packet 2 is lost again, a receive end may not receive the retransmitted packet 2. When the transmit end still does not receive, after an RTO time in which the retransmission packet 2 is sent, acknowledgment information that is for the retransmission packet 2 and that is received by the receive end, the transmit end resends the retransmission packet 2 to the receive end.

Optionally, in this embodiment of the present invention, when a quantity of times that the transmit end resends the retransmission packet exceeds N times, the transmit end stops sending the retransmitted packet to the receive end. For example, when N is 3, if consecutively sending the retransmission packet 2 for three times, the transmit end 11 does not continue to send the retransmission packet 2 to the receive end 12.

Therefore, in this embodiment of the present invention, it may be avoided that a transmit end resends a retransmission packet for multiple times because when receiving the retransmission packet, a receive end does not send acknowledgment information in a timely manner, or sent acknowledgment information cannot be sent to the transmit end.

Figure 9:
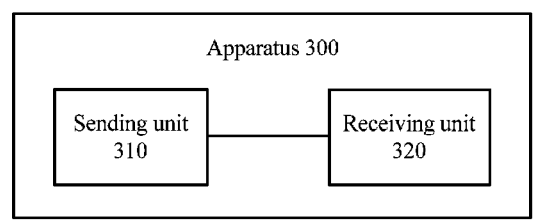
FIG. 9 is a schematic block diagram of a packet retransmission apparatus according to an embodiment of the present invention.

FIG. 9 is a schematic block diagram of a packet retransmission apparatus 300 according to an embodiment of the present invention, and the apparatus is a transmit end, for example, a server or a client, where the apparatus 300 includes a sending unit 310 and a receiving unit 320.

The sending unit 310 is configured to send, by the transmit end, a first packet to a receive end by using a first path, where the first path is a path on a Transmission Control Protocol TCP data connection.

The receiving unit 320 is configured to receive a response message by using a second path, where the response message is used to indicate that the receive end does not receive the first packet, and the response message includes an indication field, where the indication field is used to indicate that a packet is transmitted on the foregoing second path.

Optionally, the response message includes a duplicate acknowledgment DUPACK or a selective acknowledgment SACK.

Optionally, as an example, the foregoing second path is a path different from the first path on the TCP data connection, and the indication field is a priority field of a virtual local area network VLAN tag.

Optionally, when a packet header of the first packet includes the virtual local area network VLAN tag, the sending unit 310 modifies a priority field of the VLAN tag to 111, and sends a modified first packet to the receive end by using the second path.

Optionally, when a packet header of the first packet does not include the VLAN tag, the sending unit 310 adds a VLAN tag to the packet header of the first packet, where a priority field of the VLAN tag is 111; and sends a modified first packet to the receive end by using the second path.

Optionally, the first path has a first transmit queue and/or a first receive queue, and the second path has a second transmit queue and/or a second receive queue, where a priority of the second transmit queue is higher than that of the first transmit queue, and a priority of the second receive queue is higher than that of the first receive queue.

Optionally, as another example, the foregoing second path is a path on a TCP control connection, and the foregoing indication field is an address field in a TCP protocol format of the TCP control connection. The apparatus 300 further includes an establishing unit, where the establishing unit is configured to establish the TCP control connection with the receive end before the receiving unit receives the response message by using the second path.

Optionally, when the foregoing second path is a path on the TCP control connection, the sending unit 310 may encapsulate the first packet according to the foregoing TCP protocol format, where a priority field of the VLAN tag in a packet header of the encapsulated first packet is 111; and sends the encapsulated first packet to the receive end by using the second path.

Optionally, when the first path is on a first route, the establishing unit may establish the TCP control connection with the foregoing receive end on the foregoing first route.

Optionally, when the first path is on a second route, the establishing unit may establish the TCP control connection with the receive end on a third route, where a transmission rate of the third route is higher than that of the second route.

The sending unit 310 is further configured to resend the first packet to the receive end by using the second path, where the resent first packet includes the indication field.

Therefore, in this embodiment of the present invention, a response message and a first packet that needs to be retransmitted are transmitted on the second path, which can shorten a transmission delay of the response message and the retransmitted first packet, so that a receive end can receive the retransmitted first packet at a smaller time interval. Therefore, when the receive end receives the first packet, only a few packets are buffered in an out-of-order reassembly buffer of the receive end, which, in this case, can avoid overflow of the out-of-order reassembly buffer, and further avoid occurrence of a new packet loss, so as to reduce out-of-order reassembly pressure of the receive end and improve TCP data transmission performance.

Optionally, after the sending unit 310 resends the first packet to the receive end by using the second path, the receiving unit 320 may further receive an acknowledgment ACK message by using the second path, where the ACK message is used by the transmit end to determine that the receive end receives the encapsulated first packet, and the ACK message includes the address field.

Optionally, when the transmit end does not receive the foregoing ACK message within a retransmission timeout RTO time after sending the encapsulated first packet, the sending unit 310 is further configured to resend the first packet by using the second path.

Therefore, in this embodiment of the present invention, the transmit end can detect a transmission status of a retransmission packet, and discover, in a timely manner, whether the retransmission packet is lost for a second time, so as to determine whether a lost packet needs to be retransmitted again, which further improves reliability of TCP data transmission.

Figure 10:
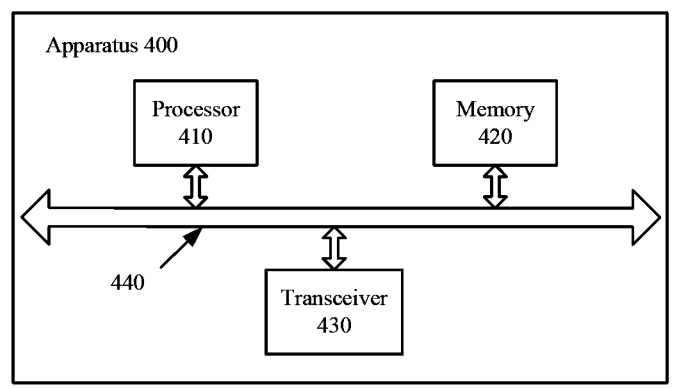
FIG. 10 is another schematic block diagram of a packet retransmission apparatus according to an embodiment of the present invention.

It should be noted that, in this embodiment of the present invention, the sending unit 310 and the receiving unit 320 may be implemented by a transceiver. As shown in FIG. 10, an apparatus 400 may include a processor 410, a memory 420, a transceiver 430, and a bus system 440. The processor 410 may be configured to determine a to-be-transmitted packet, and the memory 420 may be configured to store code executed by the processor 410, and the like.

All components in the apparatus 400 are coupled together by using the bus system 440, where in addition to a data bus, the bus system 440 further includes a power bus, a control bus, and a status signal bus.

The apparatus 300 shown in FIG. 9 or the apparatus 400 shown in FIG. 10 can implement all processes of the transmit end 11 in the method embodiments shown in FIG. 5 to FIG. 8. To avoid repetition, details are not described herein.

Figure 11:
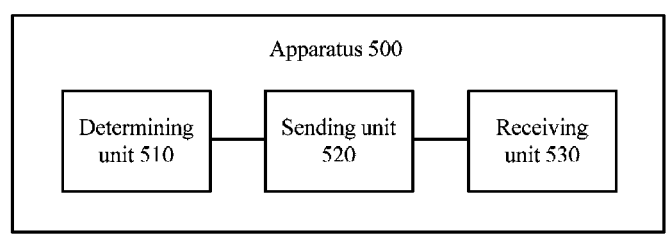
FIG. 11 is a schematic block diagram of another packet retransmission apparatus according to an embodiment of the present invention.

FIG. 11 is a schematic block diagram of a packet retransmission apparatus 500 according to an embodiment of the present invention, and the apparatus is a receive end, for example, a server or a client, where the apparatus 500 includes a determining unit 510, a sending unit 520, and a receiving unit 530.

The determining unit 510 is configured to determine, by the receive end, that a first packet sent by a transmit end is not received on a first path, where the first path is a path on a Transmission Control Protocol TCP data connection.

The sending unit 520 is configured to send, by using a second path, a response message to the transmit end, where the response message is used to indicate that the receive end does not receive the foregoing first packet. The response message includes an indication field, where the indication field is used to indicate that a packet is transmitted on the second path.

Optionally, the response message includes a duplicate acknowledgment DUPACK or a selective acknowledgment SACK.

The receiving unit 530 is configured to receive, by using the second path, a first packet that is resent by the transmit end, where the resent first packet includes the indication field.

Optionally, as an example, the foregoing second path is a path on the TCP data connection, and the indication field is a priority field of a virtual local area network VLAN tag.

Optionally, when a packet header of the response message includes the virtual local area network VLAN tag, the sending unit 520 is specifically configured to: modify a priority field of the VLAN tag to 111; and send a modified response message to the transmit end by using the second path.

Optionally, when a packet header of the response message does not include the VLAN tag, the sending unit 520 is specifically configured to: add a VLAN tag to the packet header of the response message, where a priority field of the VLAN tag is 111; and send a modified response message to the receive end by using the second path.

Optionally, the foregoing first path has a first transmit queue and/or a first receive queue, and the foregoing second path has a second transmit queue and/or a second receive queue, where a priority of the second transmit queue is higher than that of the first transmit queue, and a priority of the second receive queue is higher than that of the first receive queue.

Optionally, as another example, the second path is a path on a TCP control connection, and the indication field is an address field in a TCP protocol format of the TCP control connection; and the apparatus further includes an establishing unit, configured to establish the TCP control connection with the transmit end before the sending unit 520 sends the response message to the transmit end by using the second path.

Optionally, the first packet resent by the sending unit 520 is encapsulated according to the TCP protocol format; and after the receiving unit 530 receives, by using the second path, the first packet that is resent by the transmit end, the method further includes: decapsulating the resent first packet, so as to obtain the first packet.

Optionally, when the first path is on a first route, that the establishing unit establishes the TCP control connection with the receive end is specifically establishing the TCP control connection with the receive end on the first route.

Optionally, when the first path is on a second route, that the establishing unit establishes the TCP control connection with the receive end is specifically establishing the TCP control connection with the receive end on a third route, where a transmission rate of the third route is higher than that of the second route.

Therefore, in this embodiment of the present invention, a response message and a first packet that needs to be retransmitted are transmitted on the second path, which can shorten a transmission delay of the response message and a retransmitted first packet, so that a receive end can receive the retransmitted first packet at a smaller time interval. Therefore, when the receive end receives the first packet, only a few packets are buffered in an out-of-order reassembly buffer of the receive end, which, in this case, can avoid overflow of the out-of-order reassembly buffer, and further avoid occurrence of a new packet loss, so as to reduce out-of-order reassembly pressure of the receive end and improve TCP data transmission performance.

Optionally, after the sending unit 520 receives, by using the second path, the first packet that is resent by the transmit end, the sending unit 520 is further configured to: send an acknowledgment ACK message to the transmit end by using the second path, where the ACK message is used by the transmit end to determine that the receive end receives the resent first packet, and the ACK message includes the address field.

Therefore, in this embodiment of the present invention, the transmit end can detect a transmission status of a retransmission packet, and discover, in a timely manner, whether the retransmission packet is lost for a second time, so as to determine whether a lost packet needs to be retransmitted again, which further improves reliability of TCP data transmission.

Figure 12:
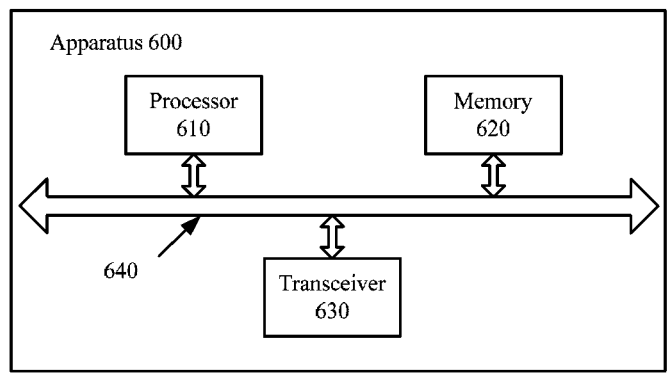
FIG. 12 is another schematic block diagram of another packet retransmission apparatus according to an embodiment of the present invention.

It should be noted that, in this embodiment of the present invention, the determining unit 510 may be implemented by a processor, and the sending unit 520 and the receiving unit 530 may be implemented by a transceiver. As shown in FIG. 12, an apparatus 600 may include a processor 610, a memory 620, a transceiver 630, and a bus system 640. The memory 620 may be configured to store code executed by the processor 610, and the like.

The apparatus 500 shown in FIG. 11 or the apparatus 600 shown in FIG. 12 can implement all processes executed by the transmit end 12 in the method embodiments shown in FIG. 5 to FIG. 8. To avoid repetition, details are not described herein.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

Methods or steps described in the embodiments disclosed in this specification may be implemented by hardware, a software program executed by a processor, or a combination thereof. The software program may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The present invention is described in detail with reference to the accompanying drawings and in combination with the exemplary embodiments, but the present invention is not limited thereto. Various equivalent modifications or replacements can be made to the embodiments of the present invention by a person of ordinary skill in the art without departing from the spirit and essence of the present invention, and the modifications or replacements shall fall within the scope of the present invention.

What is claimed is:

1. A packet retransmission method, comprising:
    sending, by a transmit end, a first packet to a receive end using a first path, wherein the first path is a path on a Transmission Control Protocol (TCP) data connection;
    receiving a response message issued by the receive end using a second path, wherein the response message indicates to the transmit end that the receive end did not receive the first packet sent by the transmit end, wherein the response message comprises an indication field value, and wherein the indication field value indicates to the transmit end to retransmit the first packet using the second path; and
    resending, by the transmit end in response to the receiving, a modified version of the first packet to the receive end using the second path, wherein the modified version of the first packet sent to the receive end using the second path comprises the indication field value.

2. The method according to claim 1, wherein the second path is a path on the TCP data connection, and the indication field value is provided in a priority field of a virtual local area network (VLAN) tag.

3. The method according to claim 1, wherein the second path is a path on a TCP control connection, and the indication field value is provided in an address field in a TCP protocol format of the TCP control connection; and
    before the receiving a response message using a second path, the method further comprises:
    establishing the TCP control connection with the receive end.

4. The method according to claim 3, wherein the resending modified version of the first packet to the receive end using the second path comprises:
    encapsulating the first packet according to the TCP protocol format; and
    sending the encapsulated first packet to the receive end using the second path.

5. The method according to claim 3, wherein when the first path is on a first route, the establishing the TCP control connection with the receive end comprises:
    establishing the TCP control connection with the receive end on the first route.

6. The method according to claim 3, wherein when the first path is on a second route, the establishing the TCP control connection with the receive end comprises:
    establishing the TCP control connection with the receive end on a third route, wherein a transmission rate of the third route is higher than a transmission rate of the second route.

7. The method according to claim 3, after the resending a modified version of the first packet to the receive end using the second path, further comprising:
    receiving an acknowledgment (ACK) message using the second path, wherein the ACK message is used by the transmit end to determine that the receive end receives the encapsulated first packet, and the ACK message comprises the address field.

8. The method according to claim 7, wherein when the transmit end does not receive the ACK message within a retransmission timeout RTO time after sending the encapsulated first packet, the transmit end resends the modified version of the first packet using the second path.

9. The method according to claim 1, wherein the first path has a first transmit queue and/or a first receive queue, and the second path has a second transmit queue and/or a second receive queue,
    wherein a priority of the second transmit queue is higher than a priority of the first transmit queue, and a priority of the second receive queue is higher than a priority of the first receive queue.

10. A packet retransmission method, comprising:
    determining, by a receive end, that a first packet sent by a transmit end on a first path was not received, wherein the first path is a path on a Transmission Control Protocol (TCP) data connection;
    sending, by the receive end, a response message to the transmit end using a second path, wherein the response message indicates to the transmit end that the receive end did not receive the first packet sent by the transmit end, wherein the response message comprises an indication field value, and wherein the indication field value indicates to the transmit end to retransmit only the first packet using the second path; and
    receiving, by the receive end in response to the sending, a modified version of the first packet using the second path that sent by the transmit end, wherein the modified version of the first packet received using the second path comprises the indication field value.

11. The method according to claim 10, wherein the second path is a path on the TCP data connection, and the indication field value is provided in a priority field of a virtual local area network (VLAN) tag.

12. The method according to claim 10, wherein the second path is a path on a TCP control connection, and the indication field value is provided in an address field in a TCP protocol format of the TCP control connection; and
    before the sending a response message to the transmit end using a second path, the method further comprises:
    establishing the TCP control connection with the transmit end.

13. The method according to claim 12, wherein the modified version of the first packet encapsulates the first packet according to the TCP protocol format; and
    after the receiving, using the second path, the modified version of the first packet, the method further comprises:
    decapsulating the modified version of the first packet, so as to obtain the first packet.

14. The method according to claim 12, wherein when the first path is on a first route, the establishing the TCP control connection with the transmit end comprises:
    establishing the TCP control connection with the receive end on the first route.

15. The method according to claim 12, wherein when the first path is on a second route, the establishing the TCP control connection with the transmit end comprises:
    establishing the TCP control connection with the receive end on a third route, wherein a transmission rate of the third route is higher than a transmission rate of the second route.

16. The method according to claim 12, after the receiving modified version of the first packet using the second path, further comprising:
    sending an acknowledgment (ACK) message to the transmit end using the second path, wherein the ACK message is used by the transmit end to determine that the receive end receives the resent first packet, and the ACK message comprises the address field.

17. The method according to claim 10, wherein the first path has a first transmit queue and/or a first receive queue, and the second path has a second transmit queue and/or a second receive queue,
    wherein a priority of the second transmit queue is higher than a priority of the first transmit queue, and a priority of the second receive queue is higher than a priority of the first receive queue.

18. A packet retransmission apparatus, comprising:
    a sending unit, configured to send, by a transmit end, a first packet to a receive end using a first path, wherein the first path is a path on a Transmission Control Protocol (TCP) data connection; and
    a receiving unit, configured to receive a response message issued by the receive end using a second path, wherein the response message indicates to the transmit end that the receive end did not receive the first packet sent by the transmit end sent by the sending unit, wherein the response message comprises an indication field value, and wherein the indication field value indicates to the transmit end to retransmit the first packet using the second path;
    wherein the sending unit is further configured to resend a modified version of the first packet, in response to receiving the response message, to the receive end using the second path, and wherein the modified version of the first packet sent to the receive end using the second path comprises the indication field value.

19. The apparatus according to claim 18, wherein the second path is a path on the TCP data connection, and the indication field value is provided in a priority field of a virtual local area network (VLAN) tag.

20. The apparatus according to claim 18, wherein the second path is a path on a TCP control connection, and the indication field value is provided in an address field in a TCP protocol format of the TCP control connection; and
the apparatus further comprises an establishing unit, wherein the establishing unit is configured to establish the TCP control connection with the receive end before the receiving unit receives the response message using the second path.

21. The apparatus according to claim 20, wherein the sending unit is specifically configured to:
encapsulate the first packet according to the TCP protocol format; and
send the encapsulated first packet to the receive end using the second path.

22. The apparatus according to claim 20, wherein when the first path is on a first route, that the establishing unit establishes the TCP control connection with the receive end is specifically:
establishing the TCP control connection with the receive end on the first route.

23. The apparatus according to claim 20, wherein when the first path is on a second route, that the establishing unit establishes the TCP control connection with the receive end is specifically:
establishing the TCP control connection with the receive end on a third route, wherein a transmission rate of the third route is higher than a transmission rate of the second route.

24. The apparatus according to claim 20, wherein after the sending unit resends a modified version of the first packet to the receive end using the second path, the receiving unit is further configured to:
receive an acknowledgment (ACK) message using the second path, wherein the ACK message is used by the transmit end to determine that the receive end receives the encapsulated first packet, and the ACK message comprises the address field.

25. The apparatus according to claim 24, wherein when the transmit end does not receive the ACK message within a retransmission timeout RTO time after sending the encapsulated first packet, the sending unit is further configured to resend the modified version of the first packet using the second path.

26. The apparatus according to claim 18, wherein the first path has a first transmit queue and/or a first receive queue, and the second path has a second transmit queue and/or a second receive queue, wherein a priority of the second transmit queue is higher than a priority of the first transmit queue, and a priority of the second receive queue is higher than a priority of the first receive queue.

27. A packet retransmission apparatus, comprising:
a determining unit, configured to determine, by a receive end, that a first packet sent by a transmit end on a first path was not received, wherein the first path is a path on a Transmission Control Protocol (TCP) data connection;
a sending unit, configured to send a response message to the transmit end using a second path, wherein the response message indicates to the transmit end that the receive end did not receive the first packet sent by the transmit end, wherein the response message comprises an indication field value, and wherein the indication field value indicates to the transmit end to retransmit only the first packet using the second path; and
a receiving unit, configured to receive, using the second path, a modified version of the first packet that is sent by the transmit end, wherein the modified version of the first packet comprises the indication field value.

28. The apparatus according to claim 27, wherein the second path is a path on the TCP data connection, and the indication field value is provided in a priority field of a virtual local area network (VLAN) tag.

29. The apparatus according to claim 27, wherein the second path is a path on a TCP control connection, and the indication field value is provided in an address field in a TCP protocol format of the TCP control connection; and
the apparatus further comprises an establishing unit, configured to establish the TCP control connection with the transmit end before the sending unit sends the response message to the transmit end using the second path.

30. The apparatus according to claim 29, wherein the modified version of the first packet sent by the sending unit encapsulates the first packet according to the TCP protocol format; and
after the receiving unit receives, using the second path, the modified version of the first packet, the method further comprises:
decapsulating the modified version of the first packet, so as to obtain the first packet.

31. The apparatus according to claim 29, wherein when the first path is on a first route, that the establishing unit establishes the TCP control connection with the transmit end comprises:
establishing the TCP control connection with the receive end on the first route.

32. The apparatus according to claim 29, wherein when the first path is on a second route, that the establishing unit establishes the TCP control connection with the transmit end comprises:
establishing the TCP control connection with the receive end on a third route, wherein a transmission rate of the third route is higher than a transmission rate of the second route.

33. The apparatus according to claim 29, wherein after the sending unit receives, using the second path, the modified version of first packet that is sent by the transmit end, the sending unit is further configured to:
send an acknowledgment (ACK) message to the transmit end using the second path, wherein the ACK message is used by the transmit end to determine that the receive end receives the resent first packet, and the ACK message comprises the address field.

34. The apparatus according to claim 27, wherein the first path has a first transmit queue and/or a first receive queue, and the second path has a second transmit queue and/or a second receive queue, wherein a priority of the second transmit queue is higher than a priority of the first transmit queue, and a priority of the second receive queue is higher than a priority of the first receive queue.

* * * * *